Patented Sept. 27, 1949

2,483,330

UNITED STATES PATENT OFFICE 2,483,330

BONDING FABRICS

Ronald George Bartlett, John Lewis Moilliet, and Reginald John William Reynolds, Blackley, Manchester, England, assignors to Imperial Chemical Industries Limited, a corporation of Great Britain No Drawing. Application April 7, 1942, Serial No. 438,016. In Great Britain May 19, 1941

5 Claims. (Cl. 154—115)

The present invention relates to the bonding of fabrics. More particularly the present invention relates to bonding fabrics with the aid of mixtures of a polyvinyl alcohol and a condensate of formaldehyde and urea or related compound.

According to the invention we bond three or more plies of fabric together by a process comprising applying to one or more of the said plies at least 70% by weight of a mixture of a polyvinyl alcohol and a condensate of formaldehyde and urea or related compound, the mixture of the said alcohol and formaldehyde condensate being as defined below, wetting the other plies, and pressing all the plies together at a temperature not below 100° C. and not so high as to scorch the fabric.

By a polyvinyl alcohol we mean a water-soluble partially or completely saponified polyvinyl ester, a 4% aqueous solution of which has a viscosity of at least 20 centipoises at 20° C. By a condensate of formaldehyde and urea or related compound we mean a preformed water-soluble condensate of urea or guanidine or melamine and formaldehyde, e. g. dimethylolurea, or a water-soluble alkyl ether of such a compound, e. g. dimethylolurea dimethyl ether. The proportion of alcohol and formaldehyde condensate to be used in the mixture according to the present invention is from one half to two parts by weight of the alcohol with one part by weight of the formaldehyde condensate. Conveniently there may be taken equal weights of the alcohol and formaldehyde condensate.

The mixture of alcohol and formaldehyde condensate as above defined, e. g. polyvinyl alcohol and dimethylolurea, is conveniently applied to the fabric by immersion of the latter in an aqueous solution of the said mixture. The fabric is then drained and dried, the alcohol and formaldehyde condensate being thereby deposited thereon. The weight of the mixture applied to the fabric is conveniently 85–110% by weight of the latter. There may be included in the mixture of alcohol and formaldehyde condensate a small proportion of an acid substance, e. g. 1% ammonium dihydrogen phosphate, calculated on the weight of the alcohol.

By working according to the process of the present invention there are obtained three- or multi-ply fabrics possessed of an excellent adhesion between the several plies. Moreover the multi-ply fabrics so obtained may be repeatedly washed without the plies coming apart. Thus the bond between the plies is not only strong but also withstands washing or laundering well.

In the case of three-ply fabrics, the bonding is conveniently brought about by applying the mixture of alcohol and formaldehyde condensate only to the centre ply, in other words to the interliner ply.

Accordingly the present invention includes the manufacture of interliners by applying to fabrics at least 70% by weight of a mixture of an alcohol and formaldehyde condensate as defined above. Such interliners may be used in the manufacture of collars. In this manner are obtained collars exhibiting the desired stiffness and freedom from discolouration, which is liable to occur when resins used in making multi-ply collars find their way from the impregnated interliner through to the outside ply and form marks on the surface. Interliners prepared in accordance with the present invention may likewise be used in the manufacture of other articles of apparel, such as cuffs and shirt fronts and the like.

The invention is illustrated but not confined to the following examples, in which, unless otherwise stated, the parts are by weight.

The polyvinyl alcohol used in the following examples except Nos. 3 and 4, exhibits in 4% aqueous solution a viscosity of 50 centipoises at 20° C. In the case of Examples 3 and 4 the corresponding value is 70 centipoises.

*Example 1*

A solution is made by dissolving 10 parts of polyvinyl alcohol and 10 parts of dimethylolurea in 90 parts of water. To the solution is added 10 parts of a 1% aqueous solution of ammonium dihydrogen phosphate.

A pattern of a plain weave cotton cloth is impregnated with the above solution and dried at 60° C. The process of impregnation and drying is repeated until sufficient polyvinyl alcohol and dimethylolurea have been deposited on the cloth to increase the weight of the latter by 90%. The impregnated cloth is now ready for use as an interliner.

Two patterns of a shirting fabric of similar size and shape to the pattern of interliner cloth, and substantially free from sizing and finishing agents, are wetted out, squeezed and then placed one on either side of the impregnated cloth or interliner. The three layers or plies of fabric are then pressed together by ironing at 150° C. for ½ minute. They thereby become firmly bonded together and adhere strongly, forming a three-ply fabric of pleasing stiffness and handle. Moreover, the three-ply fabric so-obtained can be repeatedly washed without the plies becoming separated. This may be shown by the following test.

The three-ply fabric made as described above is submitted six times to a wash in a laundry machine, carried out under the following conditions. Each wash consists of the following operations, which are conducted in accordance with normal laundry practice, the fabrics being subjected to vigorous mechanical action.

The solutions of sodium carbonate and soap which are used (separately or mixed together in various proportions as indicated) are made as follows:

*Sodium carbonate solution.*—Dissolve 125 parts of sodium carbonate in 5000 parts of water.

*Soap solution.*—Dissolve 200 parts of soap and 50 parts of sodium oleyl sulphate in 6000 parts of water.

(1) Heat up to 30° C. during 5 minutes in a solution of sodium carbonate.

(2) Heat during 15 minutes from 30° C. to 40° C. in a solution of sodium carbonate and soap (made by mixing 1000 cc. of the former with 1600 cc. of the latter).

(3) Rinse for 4 minutes in water at 85–95° C.

(4) Heat during 10 minutes from 40° C.–60° C. in a solution of sodium carbonate and soap (made by mixing 1200 cc. of the former with 1500 cc. of the latter).

(5) Rinse for 4 minutes in water at 70° C.

(6) Heat during 20 minutes from 60°–100° C. in a solution of sodium carbonate and soap (made by mixing 2000 cc. of the former with 500 cc. of the latter).

(7) Rinse for 4 minutes in water at 50° C.

(8) Rinse for 4 minutes in cold water.

*Example 2*

10 parts of polyvinyl alcohol and 10 parts of dimethylolurea are dissolved in 90 parts of water containing 1 part of a 1% aqueous solution of ammonium dihydrogen phosphate.

A pattern of a plain-weave cotton cloth is impregnated with the above solution and dried at 35° C. The process of impregnation and drying is repeated until the cloth has deposited thereon its own weight of polyvinyl alcohol and dimethylolurea. The impregnated cloth now constitutes an interliner.

Two patterns of shirting fabric of similar size and shape to the pattern of interliner, and substantially free from sizing and finishing agents, are wetted out, squeezed and placed one on each side of the interliner. The three layers are then pressed together with an iron heated to 120° C., first on one side for ½ minute and then on the other side for a further ½ minute. The layers adhere strongly, forming a three-ply fabric of pleasing stiffness and handle, which can be repeatedly washed without the plies becoming separated.

*Example 3*

A solution is made by dissolving 10 parts of polyvinyl alcohol and 10 parts of dimethylolurea in 90 parts of water. This solution is then used as in Example 2 to prepare a cotton interliner fabric containing 105% of deposited solid calculated on the original weight of the fabric.

The above interliner is used as a bonding medium for two pieces of damped shirting fabric, adhesion being effected by pressing with an iron at 150° C. for 1½ minutes on first one side and then the other. There is thereby produced a stiffened three-ply fabric capable of being repeatedly washed by the method of Example 1, without separation of the plies.

*Example 4*

10 parts of a polyvinyl alcohol and 5 parts of dimethylolurea are dissolved in 90 parts of water. This solution is used as described in Example 2 to prepare a cotton interliner fabric containing 100% of deposited solid calculated on the original weight of the fabric.

The above interliner is used as a bonding medium for two pieces of damped shirting fabric, the three plies being ironed together at 150° C. for 1½ minutes on each side of the fabric in turn. There is thus produced a stiffened three-ply fabric, the bond being of very good fastness to washing.

*Example 5*

An interliner is made as described in the first part of Example 2 except that the 10 parts of dimethylolurea are replaced by 5 parts of an aqueous solution of the dimethyl ether of dimethylolurea, prepared as below, and the ammonium dihydrogen phosphate is omitted. The said aqueous solution of the dimethyl ether of dimethylolurea is obtained by heating to reflux for 1½ hours a mixture of 10 parts of sodium hydroxide, 190 parts of methanol, 335 parts of 40% (weight/volume) aqueous formaldehyde and 125 parts of urea, and finally neutralising with hydrochloric acid.

The above interliner is used in making a three-ply fabric in the manner described in the latter part of Example 2, but for the ironing being done at 150° C. for 1½ minutes on each side of the composite fabric instead of at 120° C. for ½ minute.

*Example 6*

As Example 5 but using 20 parts in place of 5 parts of the aqueous solution of the methyl ether of dimethylolurea.

*Example 7*

7 parts of melamine and 15 parts of a 40% (weight by volume) aqueous formaldehyde solution are heated together on a steam bath until the melamine has completely dissolved, removed immediately and cooled as quickly as possible. There is then added 10 parts of polyvinyl alcohol and 1 part of ammonium dihydrogen phosphate dissolved together in 100 parts of water. This solution is used as described in Example 2 to make an interliner fabric.

Two pieces of damped shirting fabric are bonded with the above interliner by ironing at 150° C. for 2 minutes on each side. The resulting three-ply fabric has a firm stiff handle and withstands repeated washing without separation of the plies.

*Example 8*

10 parts of polyvinyl alcohol and 10 parts of the dimethyl ether of dimethylolurea are dissolved in 90 parts of water. An interliner is made by using the above solution as described in Example 2. A three-ply fabric is made from this interliner in the manner described in the previous example.

*Example 9*

As Example 8 but employing 5 parts of the dimethyl ether of dimethylolurea in place of 10 parts.

*Example 10*

A solution is made by dissolving 10 parts of poyvinyl alcohol, 10 parts of the dimethyl ether of dimethylolurea and one tenth part of ammonium dihydrogen phosphate in 90 parts of water. The solution is then used as described in Example 2 to make an interliner containing 105% of deposited solid calculated on the weight of the original fabric.

Two pieces of damped shirting fabric are bonded with the above interliner by ironing at 120–125° C. for 1 minute on each side of the composite fabric in turn. A three-ply fabric of good resistance to repeated washing and pleasing stiff handle results.

We claim:

1. The process of laminating fabrics which comprises applying to an interlining fabric a composition comprising from .5 to 2 parts of a water soluble polyvinyl alcohol and 1 part of a water soluble urea-formaldehyde condensate and thereafter bonding the plies and causing reaction between the said alcohol and condensate by subjecting them to a temperature between about 100° C. and the temperature at which the fabrics scorch.

2. The process of claim 1 in which 70 to 110 per cent of the said composition is applied to the fabric based on the weight of the said fabric.

3. The process of claim 1 in which the composition contains substantially equal parts of polyvinyl alcohol and the urea-formaldehyde condensate.

4. The process of claim 1 in which the laminated fabric is a collar.

5. The process of preparing semi-stiff collars which are highly resistant to repeated launderings which comprises applying a composition containing approximately equal parts of a water soluble polyvinyl alcohol and a water soluble urea-formaldehyde condensate to an interlining fabric in the amount of 85 to 110 per cent of the said composition based on the weight of the interlining fabric and thereafter causing further reaction between the said alcohol and condensate while simultaneously joining to the interliners a face and back-ply by applying pressure at about 150° C. for about ½ minute.

RONALD GEORGE BARTLETT.
JOHN LEWIS MOILLIET.
REGINALD JOHN WILLIAM REYNOLDS.

REFERENCES CITED

The following references are of record in the file of this patent:

UNITED STATES PATENTS

| Number | Name | Date |
|---|---|---|
| 2,062,088 | Dreyer | Nov. 24, 1936 |
| 2,066,421 | Ripper | Jan. 5, 1937 |
| 2,100,201 | Quenelle | Nov. 22, 1937 |
| 2,118,549 | Cochrane | May 24, 1948 |
| 2,169,250 | Izard | Aug. 15, 1939 |
| 2,233,875 | Schmidt et al. | Mar. 4, 1941 |
| 2,275,008 | Coffman | Mar. 3, 1942 |
| 2,312,925 | McBurney et al. | Mar. 12, 1943 |

FOREIGN PATENTS

| Number | Country | Date |
|---|---|---|
| 361,910 | Great Britain | Nov. 16, 1931 |

OTHER REFERENCES

Ellis: "The Chemistry of Synthetic Resins," published in 1935 by the Reinhold Publishing Co., 330 W. 42nd St., New York, N. Y., page 665.